(12) United States Patent
Fischer (10) Patent No.: US 10,654,187 B2
(45) Date of Patent: May 19, 2020

(54) DEVICE AND METHOD FOR THE ULTRASONIC CUTTING OF WORKPIECES

(71) Applicant: Bayerische Motoren Werke Aktiengesellschaft, Munich (DE)

(72) Inventor: Stefan Fischer, Geisenhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 127 days.

(21) Appl. No.: 15/848,625

(22) Filed: Dec. 20, 2017

(65) Prior Publication Data

US 2018/0111284 A1 Apr. 26, 2018

Related U.S. Application Data

(63) Continuation of application No. PCT/EP2016/074681, filed on Oct. 14, 2016.

(30) Foreign Application Priority Data

Oct. 26, 2015 (DE) .......................... 10 2015 220 875

(51) Int. Cl.
*B26D 7/08* (2006.01)
*B26D 5/00* (2006.01)
(Continued)

(52) U.S. Cl.
CPC ............. *B26D 7/086* (2013.01); *B23Q 15/12* (2013.01); *B26D 5/00* (2013.01); *B26F 1/3813* (2013.01); *G05B 2219/45206* (2013.01)

(58) Field of Classification Search
CPC .......... B23Q 15/12; B26D 7/086; B26D 5/00; B26F 1/3813; G05B 2219/45206
See application file for complete search history.

(56) References Cited

U.S. PATENT DOCUMENTS 4,331,051 A 5/1982 Gerber et al.
5,418,711 A 5/1995 Pomerleau et al.
(Continued)

FOREIGN PATENT DOCUMENTS

CN 104924347 A 9/2015
DE 30 16 692 A1 3/1981
(Continued)

OTHER PUBLICATIONS

International Search Report (PCT/ISA/210) issued in PCT Application No. PCT/EP2016/074681 dated Feb. 27, 2017 with English translation (Four (4) pages).
(Continued)

*Primary Examiner* — Omar Flores Sanchez
(74) *Attorney, Agent, or Firm* — Crowell & Moring LLP (57) ABSTRACT

A cutting guide device for ultrasonic cutting of workpieces is provided. The cutting guide device includes a cutting edge with a cutting edge longitudinal axis held in the cutting guide device, an ultrasound generator which oscillates the cutting edge, a control unit which controls movement of the cutting edge on a cutting path, and a first force measuring device which measures an actual lateral force on the cutting edge transverse to the cutting edge longitudinal axis and transverse to the cutting direction. The first force measuring device sends actual lateral force measurement values to the control unit, which changes at least one cutting parameter based on the measured actual lateral force. A method for using the ultrasonic cutting device is also provided.

12 Claims, 3 Drawing Sheets

(51) Int. Cl.
*B23Q 15/12* (2006.01)
*B26F 1/38* (2006.01)

(56) References Cited

U.S. PATENT DOCUMENTS

| | | | | |
|---|---|---|---|---|
| 6,095,023 | A * | 8/2000 | Harada | B26D 3/085 |
| | | | | 83/152 |
| 6,190,296 | B1 | 2/2001 | Gnad et al. | |
| 6,701,055 | B2 * | 3/2004 | Yasuda | B26D 1/04 |
| | | | | 385/134 |
| 9,242,439 | B2 * | 1/2016 | Wein | B29C 65/08 |
| 10,245,660 | B2 * | 4/2019 | Myrfield | B23D 55/046 |
| 2003/0235660 | A1 * | 12/2003 | Blanchard | B26D 3/085 |
| | | | | 428/34.1 |
| 2015/0266198 | A1 | 9/2015 | Huber et al. | |

FOREIGN PATENT DOCUMENTS

| | | |
|---|---|---|
| DE | 694 28 857 T2 | 7/2002 |
| DE | 197 53 563 B4 | 1/2005 |
| DE | 10 2011 081 747 A1 | 2/2013 |
| DE | 10 2012 223 785 A1 | 6/2014 |
| EP | 0 920 977 A1 | 6/1999 |
| GB | 2 087 290 A | 5/1982 |

OTHER PUBLICATIONS

German-language Written Opinion (PCT/ISA/237) issued in PCT Application No. PCT/EP2016/074681 dated Feb. 27, 2017 (Five (5) pages).

German-language Search Report issued in counterpart German Application No. 10 2015 220 875.3 dated Sep. 14, 2016 with partial English translation (Eleven (11) pages).

\* cited by examiner

Fig. 1A

Prior Art

Fig. 1B

Prior Art

DEVICE AND METHOD FOR THE ULTRASONIC CUTTING OF WORKPIECES

CROSS REFERENCE TO RELATED APPLICATIONS

This application is a continuation of PCT International Application No. PCT/EP2016/074681, filed Oct. 14, 2016, which claims priority under 35 U.S.C. § 119 from German Patent Application No. 10 2015 220 875.3, filed Oct. 26, 2015, the entire disclosures of which are herein expressly incorporated by reference.

BACKGROUND AND SUMMARY OF THE INVENTION

The invention relates to a device for the ultrasonic cutting of workpieces, and to a method for the ultrasonic cutting of a workpiece by a device according to the invention.

To cut workpieces, in particular workpieces with a fragile structure or easily damaged and/or temperature-sensitive material, it is advantageous when the lowest possible cutting forces are introduced into the workpiece in order not to damage the workpiece and to produce a "clean" cut surface. Furthermore, heating of the workpiece during cutting should often be avoided, in particular if this could damage the workpiece. Ultrasonic cutting has therefore proven itself worthy for cutting such pieces.

In ultrasonic cutting by a device for the ultrasonic cutting of workpieces, a cutting edge is moved by an ultrasonic generator in ultrasonic vibrations having a frequency, in particular between 20 and 40 kHz. To cut the workpiece, the cutting edge is moved in a cutting direction along a cutting path through the workpiece. Separation and friction forces that occur during cutting are significantly reduced at the cutting edge through the ultrasonic vibrations. This has the advantage that substantially lower forces are required for forward movement of the cutting edge in the cutting direction than for cutting which is not carried out with ultrasonic vibrations.

Often, a cutting path is not configured linearly but rather curved. As the cutting edge moves along a curve, lateral forces from the workpiece act on the cutting edge. These lateral forces are particularly dependent on a movement speed of the cutting edge in the cutting direction, the material of the workpiece, the design of the cutting edge and the curvature of the cutting curve. Without appropriate countermeasures, these lateral forces would bend the cutting edge away from the cutting path and thus produce an undesirable cut contour in the workpiece. A suitable countermeasure is the changing of a blade angle of the cutting edge relative to the workpiece or the workpiece surface so that it counteracts the lateral forces. A blade angle is understood according to the invention to mean an angle which is formed between the workpiece surface and the cutting edge and at a right angle to the cutting direction.

Producing a cut on a workpiece along a cutting path is also referred to as a cutting task. Reconfiguring the device to ultrasonically cut workpieces is required to ensure optimum movement of the cutting edge for the workpiece along the cutting path so that lateral forces are optimally compensated for each cutting task. The choice of the blade angle of the cutting edge for the workpiece plays an essential role here.

Known devices for the ultrasonic cutting of workpieces have, in particular, the disadvantage that the determination of a suitable blade angle is possible only with great difficulty. Often, this is only possible empirically by generating a variety of cuts on identical cutting paths and identical workpieces using different blade angles. Off-line programming of an ultrasonic cutting device is currently not technically feasible, in particular because of the many influencing parameters of the cutting forces, so that the ultrasonic cutting device must be extensively broken in when preparing for a new series of ultrasonic cuts. This is both time consuming and costly. Furthermore, with conventional devices, no lasting, process-reliable cutting can be ensured since, for example, the sharpness of the cutting edge, the ambient temperature or the structure of the workpiece can vary and thus possibly cause varying lateral forces.

It is therefore an object of the present invention to at least partially remedy the disadvantages described above in a device and a method for the ultrasonic cutting of workpieces. In particular, it is an object of the present invention to provide a device for the ultrasonic cutting of workpieces which improves the process reliability of an ultrasonic cutting process in a simple and inexpensive manner, wherein the device for performing new cutting tasks is configurable with less effort. Moreover, it is the object of the present invention to provide a method for the ultrasonic cutting of workpieces which can be performed in a simple and cost-effective manner and has improved process reliability.

According to the first aspect of the invention, the object is achieved by a device for the ultrasonic cutting of workpieces having a cutting guide device, a cutting edge with a cutting edge longitudinal axis held on the cutting guide device, an ultrasonic generator for moving the cutting edge in an oscillating motion and a control unit for moving the cutting guide device so as to move the cutting edge on a cutting path in a cutting direction relative to the workpiece to be cut. The device has a first force measuring device for measuring an actual lateral force acting on the cutting edge transversely to the cutting edge longitudinal axis as well as transversely to the cutting direction. The first force measuring device is coupled to the control unit for forwarding actual lateral force measured values to the control unit. The control unit is designed to change at least one cutting parameter of the device on the basis of the measured actual lateral force.

The cutting guide device is configured to hold and move the cutting edge in the cutting direction along the cutting path. The cutting guide device has, for example, a robot arm by which the cutting edge can be moved and aligned relative to the workpiece. Thus, the cutting edge can be brought to the workpiece and can be moved in a plurality of different relative positions by the cutting guide device into a relative position, i.e., a position and orientation.

According to the invention, a cutting edge may be, for example, a cutting wire, a blade or the like. A cutting wire or a blade are referred to as "cutting edge" within the scope of the invention. The cutting edge has a cutting edge longitudinal axis arranged transversely, preferably perpendicular, to the cutting direction during cutting.

The ultrasonic generator is configured to move the cutting edge in an oscillating movement with ultrasonic frequency and a vibration amplitude. Preferably, the oscillating movement takes place in the direction of the cutting edge longitudinal axis.

The control unit is configured for moving the cutting guide device, wherein the cutting edge is movable by moving the cutting guide device. For example, a drive of the cutting guide device for moving the cutting edge or for aligning the cutting edge or for changing the blade angle of the cutting edge can be controlled and/or regulated via the control unit. Therefore, it is preferred that the device has position and/or location detection for determining the position or location of the cutting edge relative to the workpiece. Preferably, the position and/or location detection is configured in the drive of the cutting guide device or arranged as separate units on the device.

Furthermore, the control unit is configured to change at least one cutting parameter of the device on the basis of a measured actual lateral force. In this case, the cutting parameter is preferably changed in such a way that the measured actual lateral force is compensated or at least partially compensated in this way. Compensating is understood according to the invention to mean to compensate for the effect of the actual lateral force on the cutting edge. Accordingly, compensating can be done, for example, by pivoting the cutting edge which is directed counter to a deflection of the cutting edge by the actual lateral force. Additionally or alternatively, compensating may also mean decreasing the actual lateral force, for example, by reducing a movement speed of the cutting edge along the cutting path or an increase in the oscillation frequency. The control unit is designed to change at least one cutting parameter of the device on the basis of the measured actual lateral force. That is, the control unit changes at least one cutting parameter and forwards this to the cutting guide device for movement of the cutting guide device.

A cutting path is a route on which the cut is to be made. The cutting path may, for example, run as a straight line or a curve. The device according to the invention is particularly advantageous in cutting paths with curves with respect to conventional ultrasonic cutting devices. The cutting direction is a direction in which the cutting edge is moved when cutting. The cutting direction follows the course of the cutting path. In other words, the cutting path describes a change in the cutting direction.

All parameters of a cutting process are referred to as cutting parameters, such as the movement speed of the cutting edge along the cutting path, the blade angle of the cutting edge, a leading or trailing angle of the cutting edge, an oscillation frequency or an oscillation amplitude of the cutting edge. The leading or trailing angle of the cutting edge is arranged between an axis of the momentary movement direction, wherein a leading angle above 90° means that the cutting edge of the cutting guide device runs ahead and runs behind at a trailing angle over 90° of the cutting guide device. The sum of the leading and trailing angles is 180° by definition.

By a targeted change in the cutting parameters of the cutting process changed general conditions, such as a momentary change in the cutting direction or the cutting path, a change in workpiece, cutting and/or ambient temperature or wear of the cutting edge, can be adapted such that the workpiece can produce an improved or optimized cut. Preferred changes of cutting parameters for improving the cut quality are, for example, reducing the movement speed of the cutting edge along the cutting path, changing the blade angle such that the cutting edge is lined up against the actual lateral force, setting a leading or trailing angle above 90° and/or increasing the oscillation frequency or the oscillation amplitude.

The first force measuring device is configured to measure an actual lateral force acting on the cutting edge transversely to the cutting edge longitudinal axis and transversely to the cutting direction. Accordingly, the actual lateral force acts on the cutting edge in such a way that the cutting edge can be deflected transversely to the cutting path. Measured actual lateral forces are also referred to as actual lateral force measured values. The first force measuring device has, for example, a piezoelectric element and/or a strain gauge or the like for measuring the actual lateral force. The first force measuring device is preferably arranged at a location of the device on which the actual lateral force can be measured particularly well, without hindering or impairing the cutting process.

The first force measuring device is configured to forward actual force values to the control unit. For this purpose, the first force measuring device is coupled to the control unit, for example, via a cable connection, by radio or the like. On the basis of the received actual lateral force measured values, the control unit is able to change at least one cutting parameter, whereby the actual lateral force can be compensated or at least partially compensated. Furthermore, the actual lateral force can be reduced by changing suitable cutting parameters. According to the invention, it can be provided that two or more cutting parameters can be changed, such as, for example, the blade angle and the movement speed. As a result, an optimization of the alignment of the cutting edge to the workpiece and a reduction of the actual lateral force and consequently an improved cut quality can be achieved.

Such a device has the advantage that the cutting process can be done simply and inexpensively. A direct adaptation of the cutting parameters is possible in order to compensate or partially compensate for the actual lateral forces and thereby avoid or at least reduce lateral deviation of the cutting edge from the cutting path through a regular, preferably continuous or substantially continuous measurement of the actual lateral forces. Cuts produced by the device according to the invention therefore have a particularly advantageous form. A further advantage of the device according to the invention is that no elaborate breaking in of the device is necessary for cutting new cutting tasks, since the cutting parameters can essentially be adapted reliably along the cutting path on the basis of the measured actual lateral forces. Accordingly, for example, the cutting path is essentially to be forwarded to the control unit for processing a new cutting task. This can be done off-line and requires no further empirical determinations of advantageous cutting parameters. Utilization and flexibility of the device for the ultrasonic cutting of workpieces is thus significantly improved.

According to a preferred further development of the invention, it may be provided in a device that the first force measuring device is configured to measure an actual lateral force perpendicular to the cutting edge longitudinal axis and perpendicular to the cutting direction. Such a directed actual lateral force has a particularly strong influence on a deflection of the cutting edge transversely to the cutting direction. Therefore, measuring such a directed actual lateral force is particularly advantageous for adapting the at least one cutting parameter.

It can be provided that the device has a first comparison unit which is configured to change the at least one cutting parameter by comparing the determined actual lateral force with a predetermined target lateral force on the basis of the movement speed of the cutting edge in the cutting direction and the cutting path. The first comparison unit is preferably part of the control unit. With otherwise constant cutting parameters, a higher moving speed and a narrower curve of the cutting path means an increase in the actual lateral force. A target lateral force is preferably 0 N or is defined in such a narrow tolerance field to 0 N, so that a lateral deflection of the cutting edge caused by a corresponding actual lateral force is within the tolerance range of the section to be produced. If the target lateral force is exceeded, the at least one cutting parameter, such as, for example, blade angle and/or leading or trailing angle, must be changed accordingly in order to compensate for such an actual lateral force or at least partially compensate for it and thus ensure that the cutting edge remains on the cutting path or within a defined tolerance range around the cutting path. In order to reduce a control effort, it can be provided that, given a defined target lateral force of more than 0 N, the at least one cutting parameter is changed only when the actual lateral force exceeds the target lateral force. In this way, no intervention may be made by the control unit in the case of particularly small, tolerable actual lateral forces, so that as a result, energy can be saved and wear of the device can be reduced.

Preferably, the control unit is designed to change, as a cutting parameter, a blade angle of the cutting edge to the workpiece on the basis of the measured actual lateral force. Preferably, the blade angle of the cutting edge is configured on the same plane as the actual lateral force in order to better compensate for it. For this purpose, the control unit is preferably configured to adapt the blade angle of the cutting edge to the workpiece on the basis of the determined actual lateral force in such a way that the actual lateral force is thereby completely or substantially completely compensated. Thus, the actual lateral force during the cutting process can be compensated simply and in a cost effective manner, so that the cutting edge remains on the cutting path. The produced section can be further improved in this way.

Further preferably, the device has a second force measuring device which is designed to measure an actual cutting force formed transversely to the cutting edge longitudinal axis and in the cutting direction. The actual cutting force is particularly dependent on a movement speed of the cutting edge along the cutting path and a wear state of the cutting edge. By way of regular, preferably ongoing or substantially ongoing measurement of the actual cutting force, a conclusion can thus be made about the wear state of the cutting edge. Preferably, the device is configured to indicate the wear state or the achievement of a certain wear state, preferably acoustically and/or optically. Since the actual lateral force is also dependent on the wear of the cutting edge and increases with increasing wear of the cutting edge, a timely replacement of the cutting edge and thus a reduction of the actual lateral force can be effected in this way.

It is preferred that the control unit is configured to change a movement speed of the cutting edge in the cutting direction on the basis of the actual cutting force. In this case, it is particularly preferred that the movement speed of the cutting edge in the cutting direction can be reduced with increasing actual cutting force. This has the advantage that a predetermined process reliability can be ensured even if the cutting edge is partially worn.

According to the invention, it may be provided that the device has a second comparison unit which is designed to compare the determined actual cutting force with a predetermined target cutting force on the basis of the movement speed of the cutting edge in the cutting direction to determine a wear of the cutting edge. The second comparison unit is preferably part of the control unit. The target cutting force can be determined, for example, empirically with a non-worn cutting edge. Deviation of the actual cutting force from the target cutting force above a defined tolerance limit is an indicator of a worn cutting edge. Thus, a necessary replacement of the cutting edge can be displayed in a timely manner.

Preferably, the first force measuring device is arranged in or on the cutting edge and/or on the cutting guide device. The first force measuring device is preferably arranged on a cutting receptacle of the cutting guide device for receiving the cutting edge. This has the advantage that actual lateral forces acting between the workpiece and the cutting edge can be determined particularly reliably and with little attenuation. Particularly reliable actual lateral force measurements have the advantage that a regulation of the at least one cutting parameter can be performed particularly effectively. In this way, a compensation and reduction of the actual lateral forces can be improved. As a result, a reliability and process reliability of the device for the ultrasonic cutting of materials is further improved with simple and inexpensive means.

According to a second aspect of the invention, the object is achieved by a method for the ultrasonic cutting of a workpiece by a device according to the invention. The method comprises the following method steps:

Arranging the cutting edge of the device according to the invention at a cutting start point on the workpiece;

Moving the cutting edge in an oscillating motion with the ultrasonic generator; Moving the cutting edge in a cutting direction along a predetermined cutting path with the cutting guide device;

Repeated measuring of an actual lateral force acting on the cutting edge transversely to the cutting edge longitudinal axis and transversely to the cutting direction with the first force measuring device; and Changing at least one cutting parameter of the device on the basis of the measured actual lateral force by the control unit, and preferably the cutting guide device.

When the cutting edge oscillating with the ultrasonic frequency moves along the cutting path, the cut is produced through the workpiece. In particular, by changing the direction of the cutting edge, such as when moving along a curve of the cutting path, an actual lateral force is created, which is repeatedly, preferably in an ongoing manner, measured by the first force measuring device. By evaluating the measured actual lateral force, the control unit determines a change in at least one cutting parameter to be changed for compensating or at least partially compensating, in particular for reducing the actual lateral force. For this purpose, cutting parameters of the device and other cutting parameters, such as ambient temperature, workpiece temperature, cutting temperature or humidity are taken into account. The at least one cutting parameter is then correspondingly changed to compensate for the actual cutting force, for example, by the cutting guide device or the ultrasound generator.

All the advantages that have already been described for a device for the ultrasonic cutting of workpieces according to the first aspect of the invention are also applicable to the described method.

It is preferred that one of the at least one cutting parameters of the device is changed on the basis of the measured actual lateral force. Cutting parameters of the device are, respectively, the blade angle of the cutting edge, leading or trailing angle of the cutting edge, movement speed of the cutting edge in the cutting direction along the cutting path, oscillation frequency or oscillation amplitude of the cutting edge. A change to the cutting parameters of the device has the advantage that this can be done directly or without appreciable time delays and thus a change in the actual lateral force can be responded to particularly quickly to efficiently compensate for the actual lateral force and thus ensure a position of the cutting edge on the cutting path.

Preferably, the cutting angle of the cutting edge to the workpiece is changed as a cutting parameter such that the actual lateral force is completely compensated. This means that a deflection of the cutting edge caused by the actual lateral force, which is also dependent on the material and the geometric design of the cutting edge, is compensated or substantially compensated for by changing the blade angle. In this case, for example, the blade angle is changed such that the cutting edge remains on the cutting path. As a result, a quality of the cut is ensured even at high actual lateral forces, which can occur, for example, in tight curves of the cutting path. Furthermore, higher average movement speeds of the cutting edge can thus be achieved along the cutting path without thereby adversely affecting the quality of the cut.

More preferably, an expected change in the actual lateral force is determined on the basis of the course of the cutting path and adjusted taking into account the determined change of the actual lateral force to be expected, the blade angle of the cutting edge to the workpiece is adapted to the cutting path. Such a determination is preferably performed in advance, just before the cutting edge has arrived at the corresponding point of the cutting path. An adaptation of the at least one cutting parameter can therefore already be initiated shortly before the curve, in particular in the case of particularly tight curves, wherein a breaking away of the cutting edge from a tolerance range around the cutting path is always avoided. This has the advantage that an expected change of the actual lateral force is already foreseeable and an adaptation of the at least one cutting parameter does not take place until the actual lateral force has already been substantially increased. Thus, a compensation of the actual lateral force can be improved or harmonized. Furthermore, higher movement speeds of the cutting edge are thus possible, since corresponding cutting parameters can be adapted or adjusted even before an increase in the actual lateral force.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same function and mode of operation are each provided with the same reference numerals in FIGS. 1A to 3.

Figure 1A:
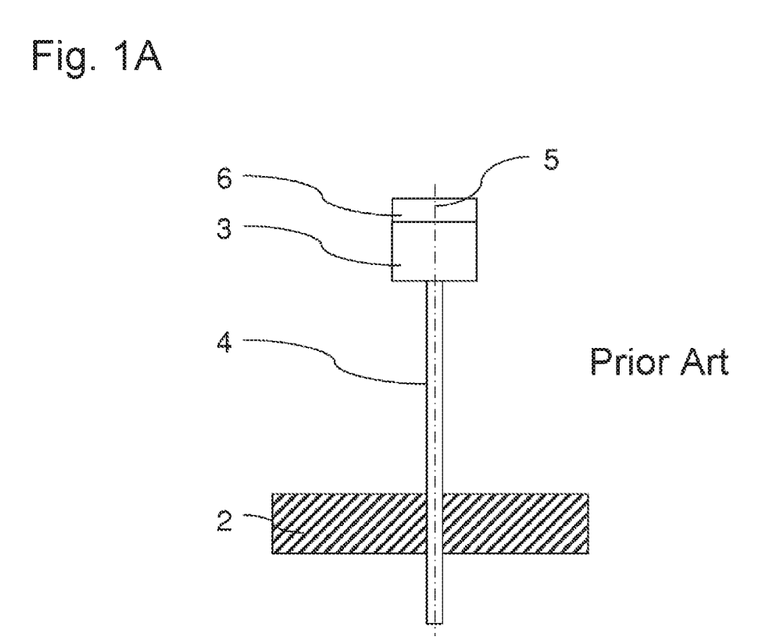
FIG. 1A is a front view of an ultrasonic cutting device according to the prior art.
Figure 1B:
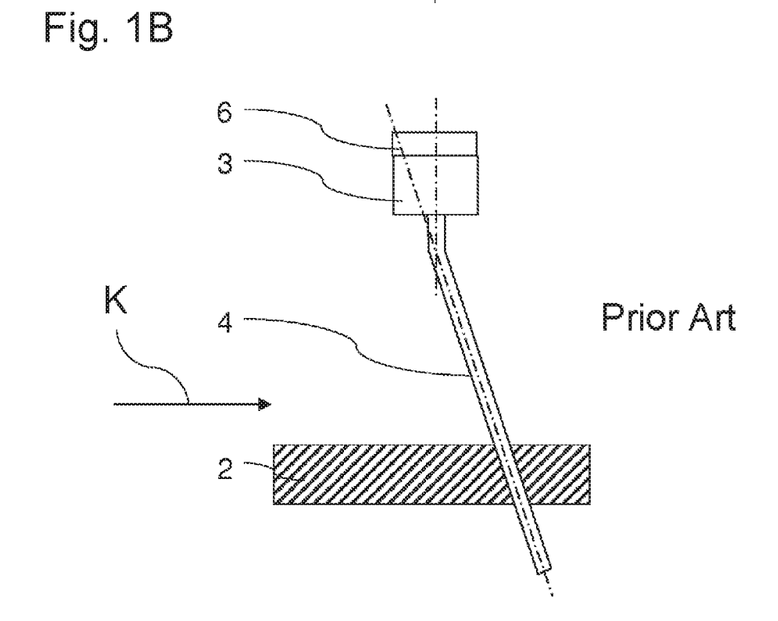
FIG. 1B is a front view of the ultrasonic cutting device of FIG. 1A with a side force.

FIG. 1A and FIG. 1B schematically show an ultrasonic cutting device according to the prior art in a front view. The ultrasonic cutting device has a cutting guide device 3, on which a cutting edge 4 with a cutting edge longitudinal axis 5 and an ultrasonic generator 6 for moving the cutting edge 4 in ultrasonic vibrations are arranged. The cutting edge 4 is arranged in a workpiece 2 in order to cut it. An ideal case is shown in FIG. 1A, for example, in a straight cutting direction 9 (see FIG. 3), in which no actual lateral force K acts between the workpiece 2 and cutting edge 4. The cutting direction 9 goes into the plane in FIGS. 1A to 2B. In FIG. 1B, an actual lateral force K acts laterally on the cutting edge 4. Without changing a blade angle 12 (see FIG. 2B) of the cutting edge 4, this is pressed laterally by the actual lateral force K, in this illustration to the right, creating a faulty cut. In order to avoid this, according to the prior art, first of all, the actual lateral forces K are to be laboriously empirically determined in order to determine a required adaptation of the cutting parameters, in particular the blade angle 12 of the cutting edge. This takes much effort, is time-consuming and costly.

Figure 2A:
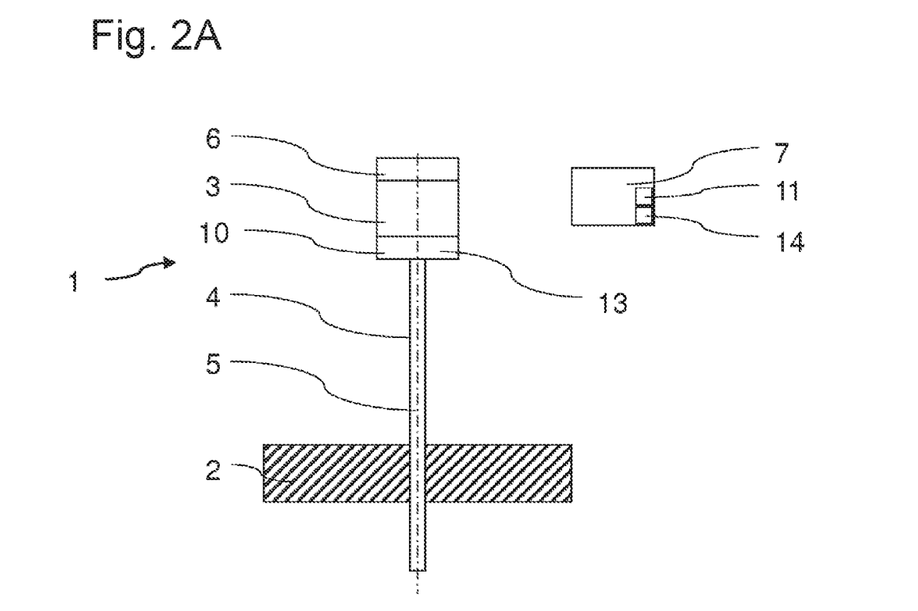
FIG. 2A is a front view of a preferred embodiment of a device according to an embodiment of the present invention.
Figure 2B:
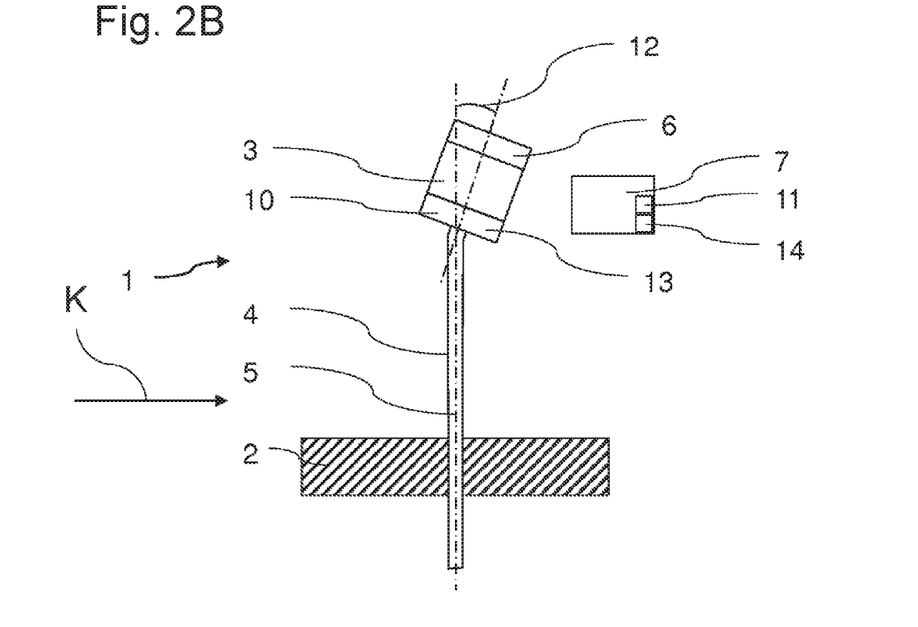
FIG. 2B is a front view of the device of FIG. 2A with a side force.

A preferred embodiment of a device 1 according to the invention for the ultrasonic cutting of workpieces 2 is shown schematically in a front view in FIGS. 2A and 2B. The device 1 has a cutting guide device 3, on which a cutting edge 4 having a cutting edge longitudinal axis 5 is arranged. An ultrasonic generator 6 is arranged on the cutting guide device 3 for moving the cutting edge 4 in ultrasonic vibrations with a vibration amplitude. A first force measuring device 10 for measuring the actual lateral force K and an optional second force measuring device 13 for measuring the actual cutting force S are arranged on a side of the cutting guide device 3 facing the cutting edge 4. The device 1 has a control unit 7 having a first comparison unit 11 for comparing the actual lateral force K with a target lateral force and a second comparison unit 14 for comparing the actual cutting force S with a target cutting force. The second comparison unit 14 may additionally be present. A simple device 1 according to the invention for the ultrasonic cutting of workpieces 2 has only the first comparison unit 11. The control unit 7 is coupled to the first force measuring device 10 and the second force measuring device 13 for receiving the measured actual lateral force K or actual cutting force S.

Figure 3:
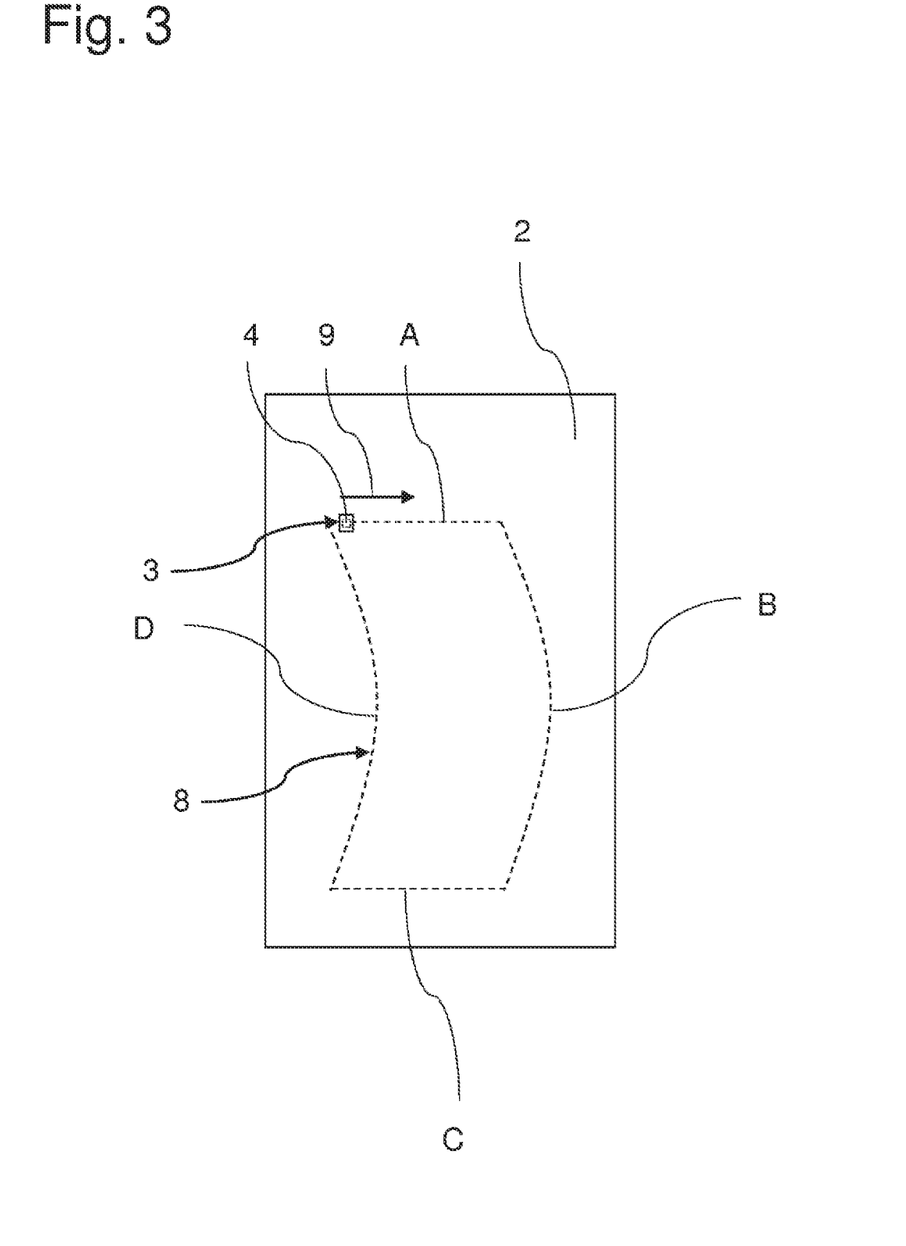
FIG. 3 is a plan view of a workpiece to be cut with cutting path.

The cutting edge 4 is arranged in a workpiece 2 for cutting the workpiece 2 along a cutting path 8 (see FIG. 3). In FIG. 2A, no actual lateral force K acts between the workpiece 2 and the cutting edge 4. A blade angle of the cutting edge 4 is therefore 0°. In FIG. 2B, an actual lateral force K acts on the cutting edge 4, which causes a bending of the cutting edge 4. This bending is completely compensated by a corresponding adjustment of the blade angle 12 in this example. The cutting edge 4 remains on the cutting path 8, so that a high quality of the cut is ensured.

In FIG. 3, a workpiece 2 to be cut is shown in a plan view. A cutting path 8 having a first path section A, a second path section B, a third path section C and a fourth path section D is shown as a dashed line. A cutting edge 4 held by a cutting guide device 3 is arranged on the first path portion A and is movable on the cutting path 8 for cutting the workpiece 2 in the cutting direction 9 (the arrow depicting cutting direction 9 also depicts the direction of the actual cutting force S). In the first path section A, the actual lateral force K is 0 N. During the transition from the first path section A to the second path section B, the actual lateral force K increases abruptly, so that an adjustment of the blade angle 12 to compensate for the actual lateral force K to be expected can already take place in an end region of the first path section A, wherein a change in the blade angle 12 takes place such that the cutting edge 4 does not leave the cutting path 8 or remains within a tolerance field around the cutting path 8. The second path section B has a curve, so that an actual lateral force which is greater than 0 N acts on the cutting edge 4 in the second path section B. This actual lateral force can be compensated by a corresponding change in the blade angle 12.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

REFERENCE LIST

1 Device
2 Workpiece
3 Cutting guide device
4 Cutting edge
5 Cutting edge longitudinal axis
6 Ultrasound generator
7 Control unit
8 Cutting path
9 Cutting direction
10 First force measuring device
11 First comparison unit
12 Blade angle
13 Second force measuring device
14 Second comparison unit
A First path section
B Second path section
C Third path section
D Fourth path section
K Actual side force
S Actual cutting force

What is claimed is:

1. A cutting guide device for ultrasonic cutting of workpieces, comprising:
    a cutting edge having a cutting edge longitudinal axis configured to be held on a cutting edge holder of the cutting guide device;
    an ultrasonic generator configured to move the cutting edge in an oscillating motion;
    a control unit configured to control movement of the cutting edge on a cutting path in a cutting direction relative to a workpiece to be cut;
    a first force measuring device configured to communicate with the control unit and to measure an actual lateral force acting on the cutting edge transversely to the cutting edge longitudinal axis and transversely to the cutting direction,
    wherein
        the first force measuring device is configured to forward to the control unit the measured actual lateral force, and
        the control unit is configured to change at least one cutting parameter based on the measured actual lateral force is a manner which counteracts the actual lateral force.

2. The cutting guide device as claimed in claim 1, wherein the first force measuring device is configured to measure the actual lateral force acting on the cutting edge transversely to the cutting edge longitudinal axis in a direction perpendicular to the cutting edge longitudinal axis and perpendicular to the cutting direction.

3. The cutting guide device as claimed in claim 2, further comprising:
    a first comparison unit configured to compare the measured actual lateral force with a predetermined target lateral force taking into account a movement speed of the cutting edge in the cutting direction,
    wherein the first comparison unit
        is at least one of integrated with and separate from the control unit, and
        is configured to provide a result of the lateral force comparison to the control unit for use in determining how to change the at least one cutting parameter of the cutting path.

4. The cutting guide device as claimed in claim 3, wherein the at least one cutting parameter is at least one of a blade angle of the cutting edge relative to the workpiece.

5. The cutting guide device as claimed in claim 4, further comprising:
    a second force measuring device configured to communicate with the control unit and to measure an actual cutting force transverse to the cutting edge longitudinal axis and in the cutting direction.

6. The cutting guide device as claimed in claim 5, wherein the control unit is configured to change the movement speed of the cutting edge in the cutting direction based on the measured actual cutting force.

7. The cutting guide device as claimed in claim 6, further comprising:
    a second comparison unit configured to determine a wear of the cutting edge in the cutting direction by comparing the determined actual cutting force with a predetermined target cutting force taking into account the movement speed of the cutting edge.

8. The cutting guide device as claimed in claim 1, wherein the first force measuring device is arranged at least one of in or on at least one of the cutting edge and the cutting edge holder.

9. A method for ultrasonically cutting a workpiece using a cutting guide device, the cutting guide device including a cutting edge having a cutting edge longitudinal axis configured to be held on a cutting edge holder of the cutting guide device, an ultrasonic generator configured to move the cutting edge in an oscillating motion, a control unit configured to control movement of the cutting edge on a cutting path in a cutting direction relative to the workpiece, and a first force measuring device configured to communicate with the control unit and to measure an actual lateral force acting on the cutting edge transversely to the cutting edge longitudinal axis and transversely to the cutting direction, wherein the first force measuring device is configured to forward to the control unit the measured actual lateral force and the control unit is configured to change at least one cutting parameter on the based on the measured actual lateral force is a manner which counteracts the actual lateral force, the method comprising the acts of:
    arranging the cutting edge at a cutting start point on the workpiece;
    moving the cutting edge in an oscillating motion generated by the ultrasonic generator in a cutting direction along a predetermined cutting path;
    measuring with the first force measuring device the actual lateral force acting on the cutting edge transversely to the cutting edge longitudinal axis and transversely to the cutting direction;
    communicating the measured actual lateral force from the first force measuring device to the control unit;
    changing at least one cutting parameter controlled by the control unit taking into account the measured actual lateral force.

10. The method as claimed in claim 9, wherein one of the at least one cutting parameters is changed on the basis of the measured actual lateral force.

11. The method as claimed in claim 10, wherein the at least one cutting parameter is at least one of a blade angle of the cutting edge relative to the workpiece; and the blade angle is changed such that the actual lateral force is completely compensated.

12. The method as claimed in claim 9, further comprising the acts of:
   determining for an anticipated change of a course of the cutting path an expected change in the actual lateral force; and
   changing at least the blade angle of the cutting edge relative to the workpiece along the course of the cutting path to maintain compensation of the actual lateral force.

\* \* \* \* \*